Figure 1:
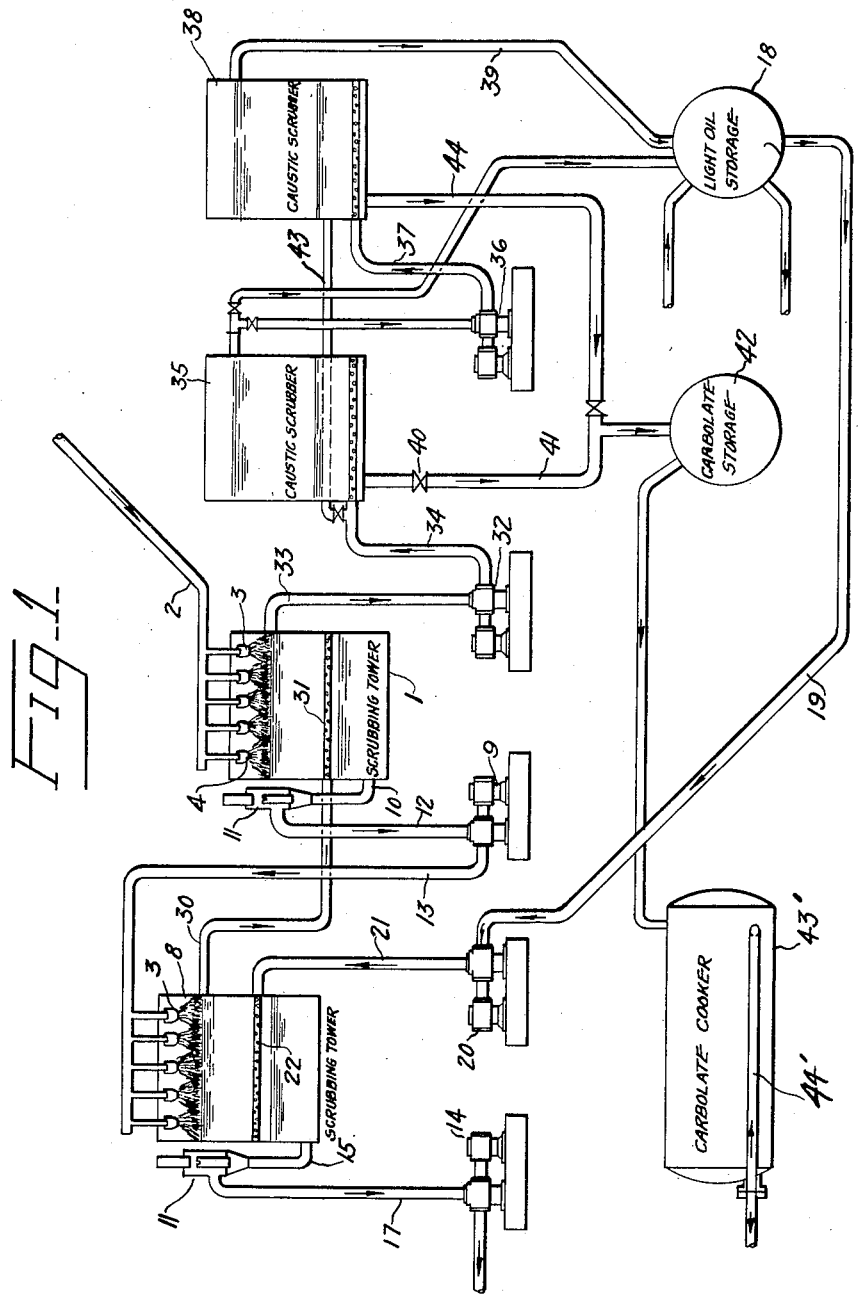

Jan. 16, 1934.   H. B. COBB   1,943,653

PROCESS FOR THE REMOVAL OF PHENOLS FROM AMMONIA LIQUORS

Filed Jan. 26, 1928   2 Sheets-Sheet 1

INVENTOR
HERBERT B. COBB
BY
ATTORNEY

Jan. 16, 1934. H. B. COBB 1,943,653
PROCESS FOR THE REMOVAL OF PHENOLS FROM AMMONIA LIQUORS
Filed Jan. 26, 1928 2 Sheets-Sheet 2

INVENTOR
HERBERT B. COBB
BY
ATTORNEY

Patented Jan. 16, 1934

1,943,653

UNITED STATES PATENT OFFICE 1,943,653

PROCESS FOR THE REMOVAL OF PHENOLS FROM AMMONIA LIQUORS

Herbert B. Cobb, Chelsea, Mass., assignor to Semet-Solvay Company, New York, N. Y., a corporation of New York Application January 26, 1928. Serial No. 249,609

7 Claims. (Cl. 260—154)

This invention relates to a process for treating liquors to remove organic compounds therefrom and more particularly to a process for removing and recovering tar acids such as phenols from the weak liquors of coal carbonization plants and apparatus therefor.

According to present methods of disposing industrial waste, it is customary to discharge waste liquors into water courses. In the operation of coal carbonization plants, the weak or waste liquors derived from the collector main circulation system, from the gas coolers and from the ammonia stills are usually discharged directly, or indirectly through sewage systems, into water courses. These liquors contain tar acids which, when discharged into streams though present in a very dilute condition, render the water in such streams unpalatable and unfit for human consumption. The unpalatable condition of the water is aggravated wherever the water is chlorinated as is quite usual in the treatment of waters used for human consumption. Consequently, many municipalities and States have legislated to the effect that tar acids such as phenols must be removed from industrial waste waters before such waters may be discharged into public waterways.

One object of the present invention is to provide a process for treating liquors to remove tar acids such as phenols therefrom that can be economically and efficiently practiced.

This invention is particularly applicable to the standard or usual by-product coke oven plant or installation wherein light oil, i. e. a liquid consisting mainly of benzol and its homologues is one of the by-products obtained from the gas distillate in the normal operation of the plant. According to this invention, the waste liquors to be treated, e. g. the so-called weak liquors containing small amounts of tar acids, ammonia and other constituents are passed through scrubbing towers in counter-current relation with a suitable extracting medium preferably light oil, in which treatment the medium extracts or absorbs the phenols or tar acids from the waste liquors. Preferably the light oil used is the unrefined oil obtained at the coke oven plant by treating the gas distillate with a suitable absorbing medium such as straw oil and thereafter distilling the resultant benzolized oil to obtain the crude light oil containing benzol, toluol, xylene, a small fraction of unsaturated compounds, i. e. olefines, and other constituents.

The phenolated light oil, i. e. the light oil containing dissolved therein the phenols extracted from the waste liquors, is preferably treated with caustic to form sodium phenolates or carbolates and simultaneously purify the light oil so that the phenols are removed therefrom. In other words, the light oil is used as a transfer medium to remove the tar acids such as phenols from the weak liquors and transfer them to the caustic in the form of carbolates. After repeated use and before detrimental contamination of the light oil takes place, the light oil is withdrawn and refined or otherwise treated to prepare commercial products such as benzol, toluol, etc.

Inasmuch as the usual by-product coke oven plant is not equipped with apparatus for the treatment of the carbolate solution, the carbolate solution is preferably concentrated so as to render its transportation commercially feasible and thereafter shipped to a consumer or manufacturer where it may be neutralized with acid such as sulfuric acid or treated with carbon dioxide or niter cake to form phenols which are purified for commercial consumption.

By using the unrefined or crude light oil, which as heretofore explained is a by-product in the usual operation of the coke oven plant, the expense of practicing this process is considerably reduced. According to this process, the light oil after repeated use as the extracting medium is withdrawn and refined, or treated for the production of commercial products therefrom, as in the case of the crude light oil obtained in the usual operation of the plant, thereby eliminating the cost of the extracting or transfer medium and thus rendering this process a commercial success, particularly as compared with a process for treating waste liquors wherein extracting mediums other than light oil are used. Benzol can be used to extract the phenols or tar acids from waste liquors, but the cost of producing benzol and purifying the benzol solution after it has been used for extraction purposes renders its use commercially unfavorable as compared with the use of light oil above described.

I have also found that by introducing the waste liquor into the scrubbing tower above the level of the extracting medium such as light oil in the tower so that the waste liquor is distributed over the surface of the light oil, a relatively uniform and efficient distribution and absorbing contact between the liquor and oil is obtained during their counter-current passage through the tower and the formation of undesirable emulsions in the light oil is avoided. This distribution of the incoming liquor over the surface of the light oil may be obtained by introducing the liquor as a spray or mist into a gas space or head in the scrubbing tower above the level of light oil therein.

Accordingly, my invention comprises a process of treating liquors containing phenolic impurities which comprises extracting the liquors with light oil to effect substantial removal of the phenolic impurities.

Figure 2:
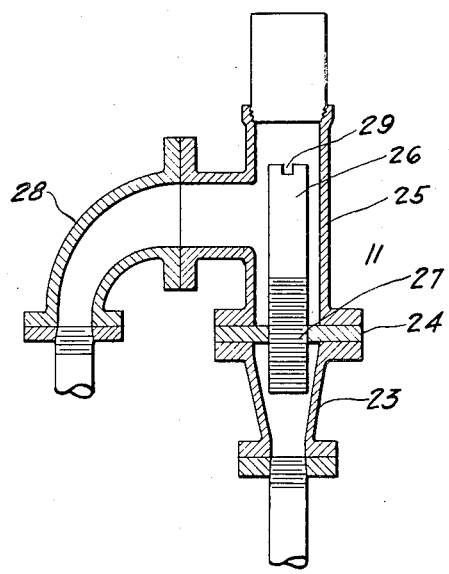
Figure 4:
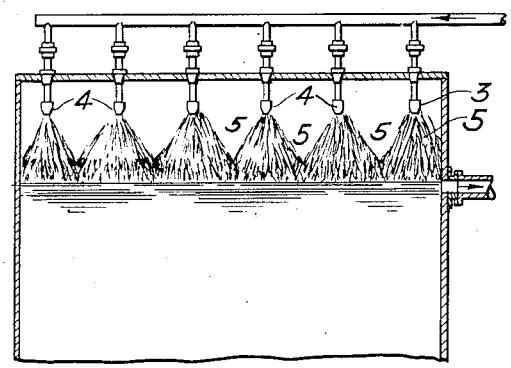
Figure 3:
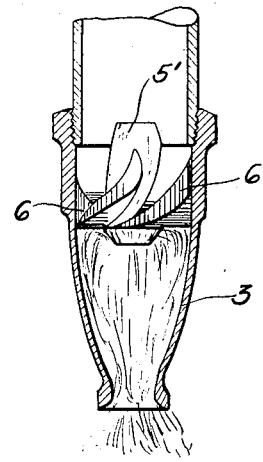

Other objects and advantages will appear from the following detailed description taken in connection with the accompanying drawings in which Fig. 1 is a diagrammatic view of the apparatus by means of which the process embodying this invention may be carried out; Fig. 2 is a fragmentary sectional detail on an enlarged scale showing a preferred type of adjustable overflow device; Fig. 3 is a fragmentary sectional detail on an enlarged scale showing a preferred form of nozzle and Fig. 4 is a fragmentary sectional detail, the nozzles depicted in elevation, of one of the liquor scrubbers showing the formation of a fine mist or spray of liquor and the deposition thereof onto the light oil layer.

The weak liquor produced in coal carbonization plants, as for example the weak or gas liquor obtained from the collector main circulation system and from the gas coolers containing, among other things, tar acids such as phenols, is pumped or otherwise fed to a scrubbing tower 1 through pipe line 2 which has connected thereto a plurality of atomizing nozzles 3, each nozzle (Fig. 3) preferably comprising a central orifice or jet 5' and a stationary turbine portion 6, the nozzles functioning to produce a uniform, dense, flaring, bouquet of spray. The nozzles extend in groups 4 disposed transversely to the tower there being sufficient groups to form a bank of nozzles so positioned with respect to the layer of light oil liquor in the scrubbing tower that they discharge into a gas space or head 5 to form a fine spray or mist covering the complete transverse plane surface of the tower just above the surface of the light oil liquor layer. The weak liquor is thus distributed as a fine spray or mist over the entire layer of light oil liquor in the tower and settles therethrough, substantially evenly distributed through the light oil liquor. The light oil liquor in tower 1 is the partially phenolated light oil, i. e., light oil containing tar acids such as phenols, which flows from liquor scrubber 8 to liquor scrubber 1, as will be hereinafter more fully explained. The weak liquor after settling through the light oil is preferably pumped by pump 9 through pipe 10, adjustable overflow device 11, pipes 12 and 13 into a second liquor scrubber 8.

The partially dephenolated liquor from tower 1, i. e., liquor which has been partially purified of its tar acid, is introduced through a bank of nozzles or atomizers 3 preferably identical in construction and arrangement with the nozzles in tower 1 and the fine mist or spray produced thereby passes onto the light oil, settles therethrough and is pumped therefrom by pump 14 through pipe 15, adjustable overflow device 11 and pipe 17 to a point of further treatment as for example, the ammonia stills. As described herein, the weak or waste liquors treated are the liquors obtained from normal operation of a by-product coke oven plant prior to the distillation of such liquors to remove ammonia. If desired, the liquors may be treated after they have been distilled to remove ammonia but since the distillation operation increases the volume of liquors due to the condensation therein of the steam used in the distillation operation, preferably, the liquors are treated as described herein prior to passage through the ammonia stills.

The light oil is pumped from a storage tank 18 through pipe 19 by pump 20 through pipe 21 and perforated pipes 22 positioned in a transverse plant above and out of contact with the weak liquor layer and in the supernatant layer of light oil. The plane of contact between the light oil layers and the weak liquor layers in towers 1 and 8 is controlled by adjusting the overflow devices 11. (Fig. 2). The adjustable overflow device preferably comprises a conical pipe section 23 threadedly connected to the pipe leading to the base of the scrubber, a diaphragm or other member 24 extending across the top end of conical pipe 23, a T 25 co-operating with pipe 23 to clamp the diaphragm 24 in position, an overflow pipe 26 in threaded engagement with a threaded opening 27 in diaphragm 24 and an elbow or other joint 28 connecting T 25 with the pipe leading to the liquor pump. Overflow pipe 26 has a tool engaging surface 29 and by means of a suitable tool, pipe 26 may be lowered and raised to position the upper end or overflow portion as desired. Changing the position of the overflow pipe changes the position of the upper surface of the light oil layer and also the level of the plane of contact between the light oil layer and the weak liquor layer. I have found that by positioning the perforated pipes for introduction of the light oil above and out of contact with the weak liquor layer and by feeding the weak liquor through atomizing nozzles as described herein a thorough distribution of weak liquor in the light oil is obtained and the formation of emulsions between the light oil and the weak liquor is avoided, thus resulting in an efficient extraction of phenols or tar acids from the weak liquor by the light oil.

Tower or scrubber 8 is preferably mounted at a higher level than tower 1 so that the partially phenolated light oil flows by gravity from tower 8 through pipe 30 into perforated pipes 31 positioned above and out of contact with the weak liquor layer and in the light oil layer as described in connection with the introduction of light oil in tower 8. The light oil in flowing up through tower 1 comes into intimate contact with the weak liquor introduced thereinto and is drawn off through pipe 33. A decanter (not shown) may be inserted in the pipe line 33 to permit the separation of weak liquor carried over by the light oil from such light oil. The phenolated light oil is forced by pump 32 from the scrubber 1 or from the decanter (not shown) through pipe 34 into a caustic scrubber. It will be noted that the flow of weak liquor through tower 1, pipe 10, overflow device 11, pipes 12, 13 into and through tower 8, pipe 15, overflow device 11 and pipe 17, and the flow of the light oil through tower 8, pipe 30, tower 1, pipe 33, is continuous.

I have found that a single caustic scrubber is sufficient to remove phenols or tar acids from the light oil but for purposes of ease of operation there is preferably provided two scrubbers arranged so that either one can be cut out of operation. The phenolated light oil liquor is pumped through pipe 34 into a caustic scrubber 35 and reacts with the caustic solution therein to form sodium phenolates or carbolates. The light oil rises to the top of the tower and may be pumped by pump 36 through pipe 37 into a second caustic tower 38 rising through the caustic solution and rising to the top, flows through pipe 150

39 to the light oil storage tank 18. At certain intervals the caustic scrubber 35 is cut out of operation and the carbolate or spent caustic removed from the tower or scrubber by opening the valve 40 in pipe 41 and leading the solution to the carbolate storage tank 42. The phenolated light oil is led through pipe 43 to caustic scrubber 38 while scrubber 35 is out of operation. Similarly, scrubber 38 may be cut out of operation and the carbolate solution therein fed through pipe 44 to the carbolate storage tank 42, the phenolated light oil being led through pipe 34 to the caustic scrubber 35. If the plant is provided with only one caustic scrubbing tower the phenolated light oil is led into a storage tank (not shown) from the liquor scrubber 1 while the carbolate is removed and fresh caustic solution is placed in this caustic scrubber.

During the course of operation, impurities gradually accumulate in the light oil which are not removed by the caustic treatment.

The light oil fed from the caustic scrubber is tested at more or less regular intervals and when it is found to be contaminated to such a degree that further contamination would make its subsequent refining or treatment impractical or uneconomical, it is withdrawn from the system and fresh light oil introduced thereto. The light oil withdrawn is refined as has heretofore been customary with the light oil washed from the distillate gas.

According to one example of the operation of my invention with the weak ammoniacal liquor entering liquor scrubber 1 containing an average of .904 grams of phenol per liter of weak liquor, the weak liquor leaving the scrubber 1 contained .224 grams of phenol per liter of weak liquor, or in other words, 75.2% of the phenols were removed from the weak liquor in scrubber 1. The resultant weak liquor was passed through scrubber 8 and left with a content of .063 grams of phenol per liter of weak liquor which is equivalent to a percentage elimination of 72.1 in scrubber 8 so that there resulted a 93.1% elimination of phenols in both towers.

The light oil entering the scrubber 8 contained .031 grams of phenol per liter of light oil, upon leaving contained .175 grams of phenol per liter of light oil and upon leaving liquor scrubber 1 contained .768 grams of phenol per liter of light oil. This phenolated light oil was introduced into the caustic scrubber 35 and then into scrubber 38. Upon leaving scrubber 35 it contained .050 grams of phenol per liter of light oil or in other words 93.5% of the phenol was removed in caustic scrubber 35, and upon leaving scrubber 38 contained .031 grams of phenol per liter of light oil so that 96% of the phenols were removed by both caustic scrubbers.

The caustic solution when introduced into scrubbers 35 and 38 contained 37% sodium hydroxide and no tar acids or phenols and when removed from the scrubbers contained 13% sodium hydroxide and 29% tar acids.

The caustic solution in the scrubbers 35 and 38 is quantitatively analyzed at more or less regular intervals preferably by neutralizing with sulfuric acid and when the concentration of the caustic solution becomes approximately 13% sodium hydroxide it is withdrawn from the tower and a fresh caustic solution introduced.

If the carbolate is to be treated for recovery of the tar acids at some other plant, it is advisable to remove some of its water content to make its transportation commercially feasible. In such cases the carbolate solution is pumped from the carbolate storage tank 42 to the carbolate cooker 43' where it is concentrated preferably by partially evaporating the solution by means of the steam coil 44' to a strength of about 45% tar acids.

It will of course be understood that while a specific embodiment of the invention has been shown and described, various changes in details thereof may be made by those skilled in the art and this invention is not to be limited to the disclosure herein but only by the scope of the appended claims.

What is claimed is:

1. In the process of removing phenolic bodies from aqueous liquors containing the same by bringing the liquor into contact with a phenol extracting medium, that improvement which comprises maintaining a body of said medium in the extraction vessel, introducing fresh medium into the lower portion of said vessel and withdrawing phenolated medium from the upper portion, introducing said phenol containing liquor into said vessel above the surface of said body of extracting medium in said vessel whereby it is distributed over said surface and caused to pass down through said body of extracting medium effectively distributed throughout said medium.

2. The process of treating liquors containing phenolic bodies which comprises maintaining a body of a phenol extracting medium in a scrubbing tower, spraying the incoming phenol containing liquor in a gas space above said extracting medium in said tower, whereby said liquor is caused to pass down through said extracting medium effectively distributed throughout, thereby effecting a substantial removal of said phenolic bodies from said liquor.

3. The process of treating liquors containing phenolic impurities in a scrubbing tower having therein a layer of treated liquor and a supernatant layer of light oil which comprises introducing fresh light oil into said tower at a level near the bottom of said layer of light oil but out of contact with said layer of liquor, spraying the incoming liquor containing phenolic impurities to form a spray of liquor extending over the top surface of said light oil layer and withdrawing the resultant phenolated light oil from approximately the top of the oil layer and the resultant substantially dephenolated liquor from approximately the bottom of the treated liquor layer.

4. The process for treating gas liquors derived from coke oven operation, which comprises the following steps:—(a) subjecting the gas liquor to extraction with light oil by passing the liquor downwardly through a tower having therein a layer of gas liquor and a supernatant layer of light oil while passing light oil liquor derived from step (b) upwardly through said tower, said liquor being introduced through sprays located above the light oil layer whereby a spray of liquor extending over the complete upper surface of said light oil layer is formed; (b) continuously passing the gas liquor from step (a) downwardly through a second tower having therein a layer of gas liquor and a supernatant layer of light oil while continuously passing fresh unrefined light oil upwardly through said second tower, said gas liquor being introduced through sprays located above the light oil layer whereby a spray of liquor extending over the complete upper surface of said light oil layer is formed; (c) subjecting the light oil from step (a) to treatment with caustic, thereby purifying said light oil; and (d) passing the purified light oil from step (c) to storage for re-use in step (b).

5. The process for treating gas liquors derived from coke oven operation, which comprises the following steps:—(a) subjecting the gas liquor to extraction with light oil by passing the liquor downwardly through a tower having therein a layer of gas liquor and a supernatant layer of light oil while passing light oil liquor derived from step (b) upwardly through said tower, said light oil being introduced at a level above the said layer of gas liquor and into the lower portion of the light oil layer; (b) continuously passing the gas liquor from step (b) downwardly through a second tower having therein a layer of gas liquor and a supernatant layer of light oil while continuously passing fresh, unrefined light oil upwardly through said second tower, said light oil being introduced at a level above the said layer of gas liquor and into the lower portion of the light oil layer; (c) subjecting the light oil from step (a) to treatment with caustic, thereby purifying said light oil; and (d) passing the purified light oil from step (c) to storage for re-use in step (b).

6. The process of treating liquors containing phenolic impurities in a scrubbing tower having therein a layer of treated liquor and a supernatant layer of extracting medium, the improvement comprising the step of continuously introducing the extracting medium into said tower at a level near the bottom of said layer of extracting medium but out of contact with said layer of liquor.

7. The process of treating liquors containing phenolic impurities in a scrubbing tower having therein a layer of treated liquor and a supernatant layer of light oil, the improvement comprising the step of continuously introducing the fresh light oil into said tower at a level near the bottom of said layer of light oil but out of contact with said layer of liquor.

HERBERT B. COBB.